(12) United States Patent
Bixler et al.

(10) Patent No.: US 9,302,872 B2
(45) Date of Patent: Apr. 5, 2016

(54) DIAMETER MEASUREMENT OF A ROLL OF MATERIAL IN A WINDING SYSTEM

(71) Applicant: Kimberly-Clark Worldwide, Inc., Neenah, WI (US)

(72) Inventors: Gregory Michael Bixler, Appleton, WI (US); Vivek Moreshwar Karandikar, Neenah, WI (US); Daniel James Wilczynski, Neenah, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 224 days.

(21) Appl. No.: 13/953,915

(22) Filed: Jul. 30, 2013

(65) Prior Publication Data

US 2015/0034757 A1  Feb. 5, 2015

(51) Int. Cl.
| | | |
|---|---|---|
| *B65H 23/18* | (2006.01) | |
| *B65H 23/00* | (2006.01) | |
| *G01B 11/06* | (2006.01) | |
| *G01B 11/10* | (2006.01) | |

(52) U.S. Cl.
CPC .......... *B65H 23/005* (2013.01); *G01B 11/0608* (2013.01); *G01B 11/105* (2013.01); *B65H 2553/41* (2013.01)

(58) Field of Classification Search
CPC .......................... B65H 23/005; B65H 2553/41
USPC ................. 242/413, 413.1–413.2, 534, 421.2
See application file for complete search history.

(56) References Cited

U.S. PATENT DOCUMENTS

| | | | |
|---|---|---|---|
| 4,410,147 A | | 10/1983 | Seibert |
| 4,691,499 A | | 9/1987 | Umeda et al. |
| 4,788,558 A | | 11/1988 | Caldwell et al. |
| 5,141,169 A | * | 8/1992 | Sugioka ..................... 242/413.1 |
| 5,267,703 A | | 12/1993 | Biagiotti |
| 5,806,785 A | * | 9/1998 | Laplante et al. ............... 242/534 |
| 5,901,918 A | | 5/1999 | Klerelid et al. |
| 5,986,745 A | | 11/1999 | Hermary et al. |
| 6,036,137 A | * | 3/2000 | Myren ........................ 242/541.7 |
| 6,443,385 B1 | | 9/2002 | Grandauer et al. |
| 6,924,746 B2 | | 8/2005 | Hermary et al. |
| 2004/0246473 A1 | | 12/2004 | Hermary et al. |
| 2005/0156078 A1 | | 7/2005 | Ragard et al. |
| 2010/0228518 A1 | | 9/2010 | Shakespeare et al. |
| 2012/0218437 A1 | | 8/2012 | Hermary et al. |

FOREIGN PATENT DOCUMENTS

| | | |
|---|---|---|
| AU | 686554 | 2/1998 |
| EP | 0602504 B1 | 2/1998 |
| GB | 2195322 A | 4/1988 |
| GB | 2221227 A | 1/1990 |
| WO | 2012167386 A1 | 12/2012 |

* cited by examiner

*Primary Examiner* — Sang Kim
(74) *Attorney, Agent, or Firm* — Armstrong Teasdale LLP

(57) ABSTRACT

A web winding and measuring system is provided. The system includes a rotatably-mounted spool onto which a web of material is wound to form a roll. The system additionally includes a light-emitting device configured to illuminate the roll by light, providing a line on a cylindrical surface of the roll in a cross-machine direction, a light-receiving device configured to detect the line and generate measurement data from the detected line, and a computing device communicatively coupled to the light-receiving device and configured to receive the measurement data and calculate a diameter of the roll.

13 Claims, 5 Drawing Sheets

DIAMETER MEASUREMENT OF A ROLL OF MATERIAL IN A WINDING SYSTEM

FIELD

This invention relates generally to the handling of webs of material, and more particularly to a system and method for winding a web of material into a roll and measuring a diameter of the roll as the roll is being wound.

BACKGROUND

In some known winding systems for a web of material, such as paper, the web is wound into a roll. In some systems, the web is perforated at predetermined intervals to form "sheets" such that the sheets may be separated from the roll at a later time. Additionally, in at least some known winding systems, the web of material has a topography that includes a pattern, such as a ripple pattern, that includes indentations and/or embossments that affect a density of the roll as the web is wound. More specifically, a first web having a first pattern may wind into a roll that has a lower density than a second web having a second pattern, when all other parameters, such as tension on each of the two webs, are equal.

In some known winding systems, parameters for controlling winding of a web into a roll are pre-calculated based on a mathematical model. The mathematical model incorporates assumptions regarding the compression of sheets of the roll as the roll is wound. Once the roll is completely wound, aspects such as the density, compressibility, number of sheets in the roll, and diameter of the roll are measured. Based on such measurements, the assumptions are adjusted, and the mathematical model is revised.

Typical through roll variability that occurs during the winding of a roll cannot be accounted for by examining rolls after they are wound. In particular, measuring a finished roll does not provide direct information about factors affecting the density, compressibility, and diameter as the roll is being wound. Importantly, such factors may vary as the roll is being wound. Accordingly, known winding systems do not provide information on how such factors change during the winding of the roll and, as a result, may lead to extended trial and error as assumptions are adjusted and the mathematical model is iteratively revised to achieve target characteristics for a roll.

SUMMARY

In one aspect, a web winding and measuring system generally comprises a rotatably-mounted spool onto which a web of material is wound to form a roll. A light-emitting device is configured to illuminate the roll by light, providing a line on a cylindrical surface of the roll in a cross-machine direction. A light-receiving device is configured to detect the line and generate measurement data from the detected line. A computing device is communicatively coupled to the light-receiving device and configured to receive the measurement data and calculate a diameter of the roll as it is being wound.

In another aspect, a method generally comprises winding a web of material into a roll on a rotatably-mounted spool. The method additionally includes illuminating the roll and providing a line on a cylindrical surface of the roll in a cross-machine direction, by a light-emitting device. The line is detected by a light-receiving device. Measurement data from the detected line is generated by the light-receiving device. The measurement data is received by a computing device communicatively coupled to the light-receiving device. The computing device calculates a diameter of the roll.

In another aspect, a non-transitory computer readable medium generally comprises instructions that, when executed by a computing device of a web winding and measuring system, cause the web winding and measurement system to wind a web of material into a roll on a rotatably-mounted spool, illuminate the roll and provide a line on a cylindrical surface of the roll in a cross-machine direction using a light-emitting device, detect the line and generate measurement data from the detected line using a light-receiving device, and receive the measurement data and calculate a diameter of the roll using a computing device communicatively coupled to the light-receiving device.

BRIEF DESCRIPTION OF THE DRAWINGS

Corresponding reference characters indicate corresponding parts throughout the drawings.

DETAILED DESCRIPTION

Figure 1:
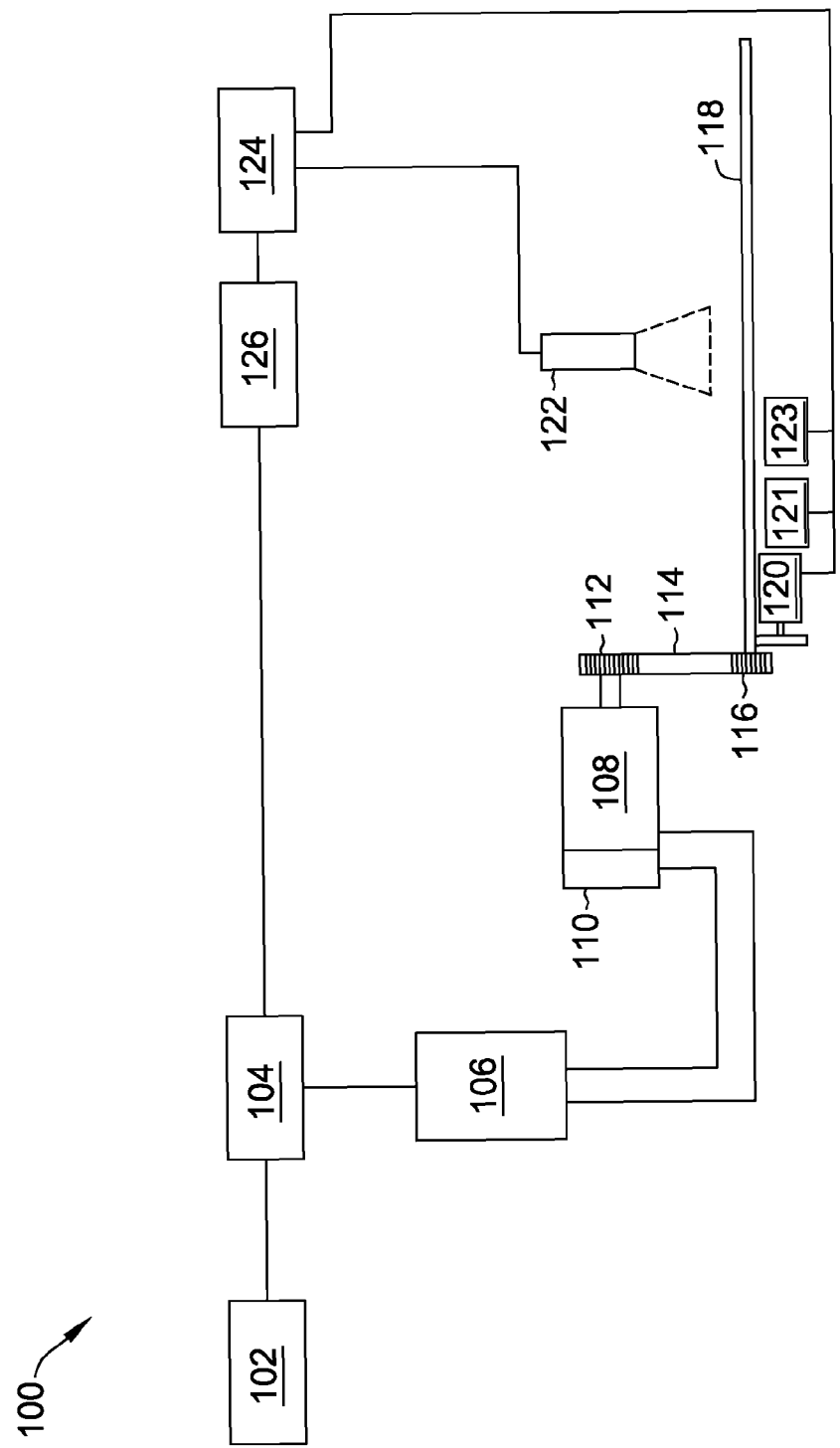
FIG. 1 is a diagram of one suitable embodiment of a web winding and measuring system for winding a web of material into a roll and measuring a diameter of the roll as it is being wound.

Embodiments of the systems and methods described herein enable the generation of a mathematical model that may be used to simulate the winding of a web of material into a roll and predict characteristics of the resulting roll, given certain parameters. For example, a web of material may have certain starting parameters, such as a thickness of the web, a topography of the web, a chemistry that may affect compression of the web, and a diameter of a cylinder onto which the web is wound (e.g., a cardboard cylinder). In addition, certain operating parameters, such as the tension on the web, the speed at which the web is wound, and the ambient humidity, may be held constant or varied over time. For example, in producing certain types of rolls, parameters such as the tension on the web and/or the rotational speed of the spool on which the web is wound may be varied during the winding of the roll to achieve desired non-uniformities in the resulting characteristics of the roll. More specifically, a desired resulting characteristic may be a relatively high density towards an inner circumference of the roll and a lower density towards an outer circumference of the roll. Other example resulting characteristics of the roll may include the number of sheets in the roll, the diameter of the roll, the compressibility of the roll, and the thickness or caliper of the web of material in the roll.

Operators of a system for winding a web of material into a roll need not perform expensive and time-consuming trial and error to achieve a roll with a set of target characteristics. By entering starting parameters and operating parameters into a mathematical model generated by the web winding and measuring system, the mathematical model may provide the operators with the characteristics of the resulting roll. Likewise, by entering target characteristics into the mathematical model, along with the starting parameters, the mathematical model may provide the required operating parameters to obtain the target characteristics of the roll. Additionally, by entering the target characteristics and the operating parameters, the mathematical model may provide the required starting parameters to achieve the target characteristics for the resulting roll.

As described herein, the data for generating a mathematical model is collected using at least a scanning device directed at the roll as it turns, to measure the diameter of the roll as the roll is being formed, and one or more sensors that measure or derive the position of a spool rotating the roll, a rotational speed of the spool, and/or a tension exerted by the spool on the web. Additionally, the system may include one or more sensors that measure ambient humidity. The model may be generated after one roll has been generated, or after multiple rolls, for example, fifty rolls, have been generated. Using statistical modeling techniques, for example regression analysis, the system generates a mathematical model of the relationship between the above-described parameters and the characteristics of the resulting roll.

FIG. 1 is a diagram of one embodiment of a web winding and measuring system, indicated generally at 100, for winding a web of material into a roll and measuring a diameter of the roll as it is being wound. The system 100 includes a first computing device 102 communicatively coupled to a programmable logic controller (PLC) 104. The PLC 104 is communicatively coupled to a servo drive 106. The servo drive 106 is communicatively coupled to a servo motor 108 and an encoder 110. The servo motor 108 is coupled to a motor pulley 112. The motor pulley 112 is operatively coupled to a spool pulley 116 through a drive belt 114. The spool pulley 116 is coupled to a spool 118. That is, the spool 118 is rotatably mounted to the spool pulley 116. Additionally, an encoder 120 is operatively coupled to the spool 118. The encoder 120 is communicatively coupled to an interface board 124. Additionally, a scanning device 122 is communicatively coupled to the interface board 124. The interface board 124 is communicatively coupled to a second computing device 126. In some implementations, the second computing device 126 is communicatively coupled to the PLC 104.

In the illustrated embodiment, the first computing device 102 generates instructions for configuring the PLC 104 to control the servo drive 106. More specifically, the first computing device 102 generates instructions based on predetermined parameters for controlling winding of a web of material 200 (shown in FIG. 2) into a roll 202 (shown in FIG. 2). The parameters incorporate assumptions regarding, for example, the density and compressibility of the finished roll 202, a target number of sheets in the finished roll 202, and a target diameter of the finished roll 202. The first computing device 102 configures the PLC 104 to operate in accordance with the parameters. More specifically, the PLC 104 transmits instructions to the servo drive 106, to operate the servo motor 108 according to an electronic cam profile based on the parameters. The electronic cam profile dictates positions and velocities for the servo motor 108, based on the parameters. The servo drive 106 transmits power and instructions to the servo motor 108 in accordance with the electronic cam profile and receives feedback regarding the position and/or velocity of the servo motor 108 from the encoder 110.

The servo motor 108 rotates the motor pulley 112 which is coupled to the spool pulley 116 by the drive belt 114. As the spool pulley 116 rotates the spool 118, the encoder 120 generates position and velocity data about the spool 118 and transmits the data to the interface board 124. A tension sensor 121 derives tension exerted by the spool 118 on a web of material being wound by the spool 118 and transmits tension data to the interface board 124. The scanning device 122 repeatedly emits light towards the spool 118 and samples the light to generate measurement data, as described in more detail with reference to FIG. 2. The scanning device 122 transmits the measurement data to the interface board 124. The interface board 124 additionally receives the position and velocity data from the encoder 120 and transmits instructions to the scanning device 122 to synchronize the rate of sampling with the rotational speed of the spool 118. Further, a humidity controller 123 measures and controls ambient humidity. Additionally, the humidity controller 123 transmits humidity data to the interface board 124. The interface board 124 transmits the measurement data, the position and velocity data, the tension data, and the humidity data to the second computing device 126. Some embodiments do not include the tension sensor 121. Also, some embodiments do not include the humidity controller 123.

Figure 2:
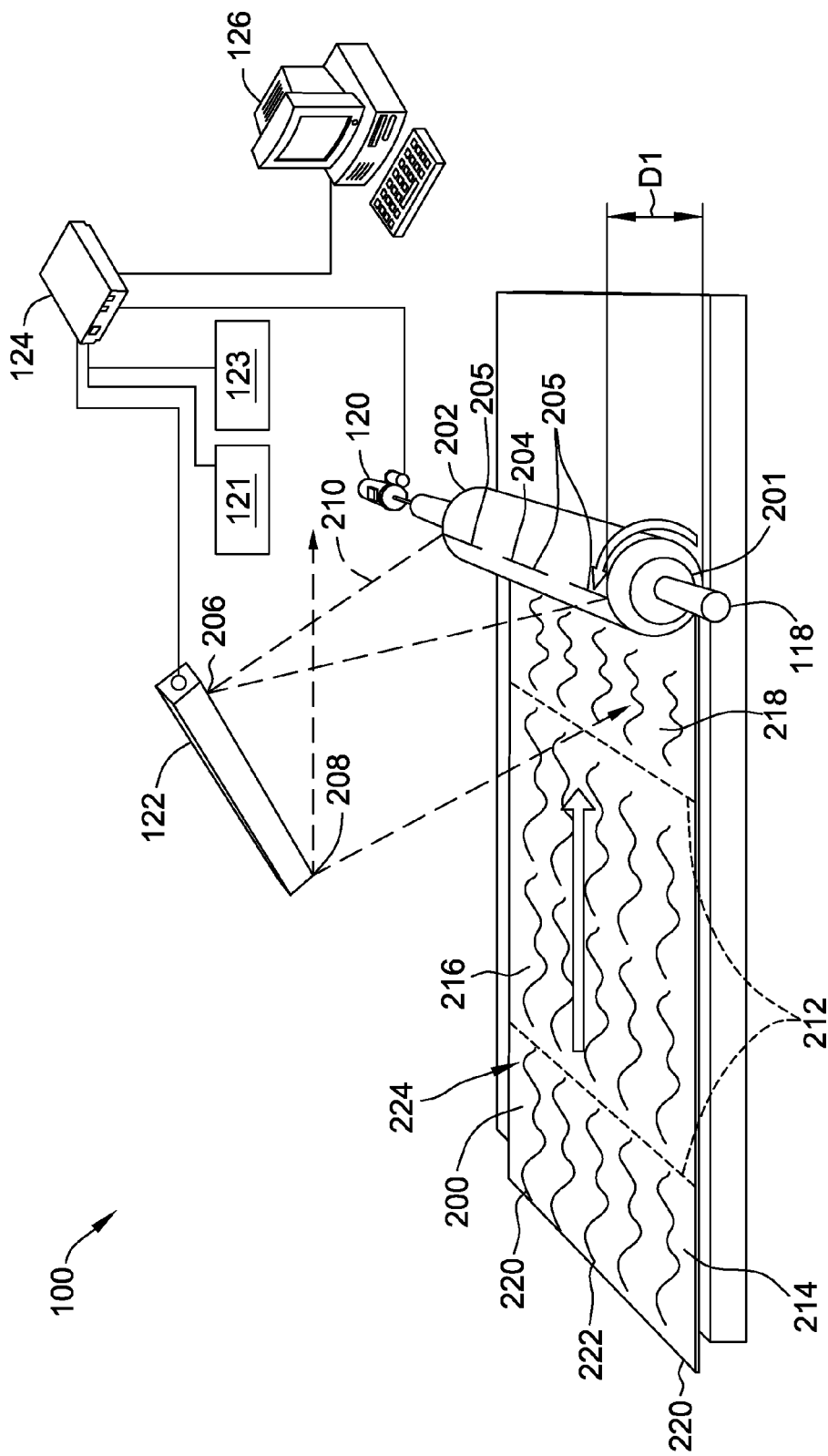
FIG. 2 is a diagram of the web winding and measuring system of FIG. 1 with a web of material being wound into a roll.

The second computing device 126 receives the measurement data from the interface board 124 and calculates the diameter of the roll 202 (shown in FIG. 2). As the spool 118 continues to rotate, the scanning device 122 repeatedly generates measurement data and transmits the measurement data to the second computing device 126 through the interface board 124. Accordingly, the second computing device 126 continuously collects measurement data and repeatedly calculates the diameter of the roll 202 as the roll 202 grows. In some embodiments, the second computing device 126 generates, in memory, a three dimensional profile of the roll of material based on the collected measurement data. In other suitable implementations, the second computing device 126 determines at least one target characteristic of the roll 202 to be achieved by the web winding and measuring system 100 and analyzes the measurement data to determine whether the at least one target characteristic has been achieved. The at least one target characteristic may include, for example, a target number of sheets of the roll 202, a target diameter for the roll 202, and/or a target ratio of a number of sheets of the roll 202 to a diameter of the roll 202.

In some embodiments, the second computing device 126, upon determining that the at least one target characteristic has not been achieved, determines an adjustment to at least one parameter to achieve the target characteristic. The second computing device 126 then transmits the at least one adjusted parameter to the first computing device 102 and/or directly to the PLC 104 to cause the PLC 104 to be configured based on the at least one adjusted parameter. In some implementations, the second computing device 126 determines, for example, an adjustment to an amount of tension exerted on the web of material by the servo motor 108 and/or spool 118. Also, second computing device 126 may determine an adjustment to a rotational speed of the servo motor 108 and/or the spool 118. In some embodiments, the adjustments are not a constant increase or decrease to the parameter, but rather are time-dependent or diameter-dependent adjustments. For example, the adjustment may be to increase the tension by a specified amount only after the roll has reached a specified diameter. Also, in some embodiments, a sheet count, a sheet caliper, and/or a sheet moisture may be adjusted.

Additionally, in some embodiments, and as described in more detail herein, the second computing device 126 generates a mathematical model of how the starting parameters and operating parameters affect the resulting characteristics of a roll. The second computing device 126 generates the mathematical model by applying one or more statistical techniques, such as linear or polynomial regression, and/or principal component analysis to the collected data to determine how parameters affect the resulting characteristics of a roll and which parameters have the most influence in affecting the resulting characteristics of the roll. In some embodiments, the first computing device 102 and the second computing device 126 are a single computing device. In other embodiments, the second computing device 126 transmits the mathematical model to the first computing device 102.

Accordingly, upon entering a set of parameters into first computing device 102, an operator of web winding and measuring system 100 may execute a simulation of forming a roll, based on the parameters, prior to actually forming the roll on the web winding and measuring system 100. In other instances, an operator may enter a set of target characteristics and starting parameters into the first computing device 102, and the first computing device 102 provides the operator with a set of operating parameters required to achieve the target characteristics, based on the mathematical model.

FIG. 2 is another diagram of the web winding and measuring system 100. A web of material 200, for example paper, paper towels, toilet paper, or facial tissue, is being wound into a roll 202 on the spool 118. In some embodiments, the spool 118 rotates a cylinder 201 onto which the web of material 200 is wound. The cylinder 201 may be of any diameter and is preferably made of a stiff material, such as cardboard, to support the roll 202 when the roll 202 is later removed from the spool 118. The illustrated web 200 includes perforations 212 that facilitate separating the web of material 200 into individual sheets 214, 216, 218. The second computing device 126 may use this information to calculate the density (i.e., a ratio of the number of sheets to the diameter of the roll) of the roll 202 at any given diameter.

As the web 200 is wound into the roll 202, the diameter, D1, of the roll 202 increases. However, due to environmental conditions, the diameter, D1, of the roll 202 may not increase uniformly across the length of roll 202 as the spool 118 rotates. Rather, outer portions 220 of the web 200 and the roll 202 may compress more than an inner portion 222, due, for example, to ambient humidity, which may be measured by the humidity controller 123, transmitted to interface board 124, and transmitted to the second computing device 126. Moreover, the ambient humidity may affect the thickness or caliper of web 200. Additionally, the web 200 includes a pattern 224 of embossments and indentations that affects compression and density of the roll 202 as the spool 118 rotates. Correspondingly, for a target diameter of the roll 202, different amounts of compression of the web 200 will change the number of the sheets 214, 216, 218 required to achieve the target diameter.

The scanning device 122 includes a light-emitting device 206 configured to illuminate the surface of the roll 202 and a light-receiving device 208 configured to detect the emitted light. More specifically, in some implementations, the light-emitting device 206 projects a reference laser plane 210 towards the roll 202 and forms a line 204 on the cylindrical surface of the roll 202, in a cross-machine direction (i.e., along the length of the roll 202).

The light-receiving device 208, which is for example a camera, detects the line 204 and generates measurement data. More specifically, the light-receiving device 208 generates a list of data points that represent a profile of the intersection of the reference laser plane 210 and the roll 202 (i.e., line 204). The data points represent, for example, a distance between the light-receiving device 208 and each of a plurality of points 205 along the line 204. The light-receiving device 208 then maps the data points to a Cartesian coordinate system and transmits the mapped data points to the interface board 124 as measurement data. The interface board 124 transmits the measurement data to the second computing device 126 as described with reference to FIG. 1. After receiving the measurement data, the second computing device 126 calculates a diameter of the roll 202 for each point 205 along the length of the roll 202. The second computing device 126 repeatedly calculates the diameter for each point 205 along the length of the roll 202 as the spool 118 rotates and the roll 202 increases in diameter.

Figure 3:
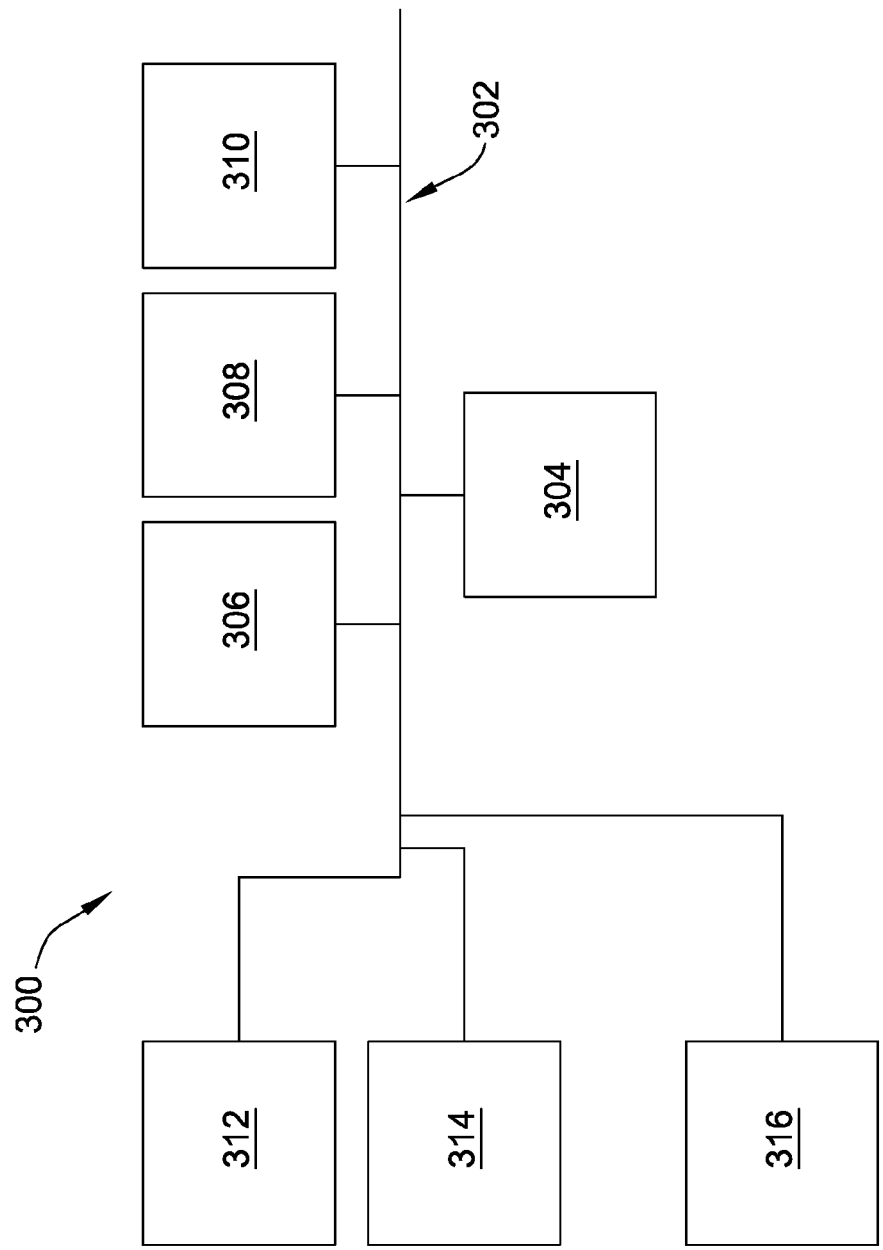
FIG. 3 is a diagram of an example computing device for use with the web winding and measuring system of FIG. 1.

FIG. 3 is a diagram of an example computing device 300 that is representative of the first computing device 102 and the second computing device 126. Additionally, the PLC 104, the servo drive 106, the encoder 110, the encoder 120, the scanning device 122 and/or other components of the system 100 may include one or more components of the computing device 300. The computing device 300 may include a bus 302, a processor 304, a main memory 306, a read only memory (ROM) 308, a storage device 310, an input device 312, an output device 314, and a communication interface 316. The bus 302 may include a path that permits communication among the components of the computing device 300.

The processor 304 may include any type of conventional processor, microprocessor, or processing logic that interprets and executes instructions. The main memory 306 may include a random access memory (RAM) or another type of dynamic storage device that stores information and instructions for execution by the processor 304. The ROM 308 may include a conventional ROM device or another type of static storage device that stores static information and instructions for use by the processor 304. The storage device 310 may include a magnetic and/or optical recording medium and its corresponding drive. The storage device 310 may include multiple storage units such as hard disks or solid state disks in a redundant array of inexpensive disks (RAID) configuration. The storage device 310 may include a storage area network (SAN) and/or a network attached storage (NAS) system.

The input device 312 may include a conventional mechanism that permits the computing device 300 to receive commands, instructions, or other inputs from a user, including visual, audio, touch, button presses, stylus taps, etc. Accordingly, the input device 312 may include, for example, a camera, a microphone, one or more buttons, and/or a touch screen. The output device 314 may include a conventional mechanism that outputs information to a user, including a display (including a touch screen) and/or a speaker. The communication interface 316 may include any transceiver-like mechanism that enables the computing device 300 to communicate with other devices and/or systems. The communication interface 316 may include a wired or wireless network adapter or, in some implementations, a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

The computing device 300 may perform operations in response to the processor 304 executing software instructions contained in a computer-readable medium, such as the memory 306. A computer-readable medium may be defined as a physical or logical memory device and/or carrier wave. The software instructions may be read into the memory 306 from another computer-readable medium, such as the data storage device 310, or from another device via the communication interface 316. The software instructions contained in the memory 306 may cause the processor 304 to perform processes described herein. In other implementations, hard-wired circuitry may be used in place of or in combination with software instructions to implement processes consistent with the subject matter herein. Thus, implementations consistent with the principles of the subject matter disclosed herein are not limited to any specific combination of hardware circuitry and software.

Figure 4:
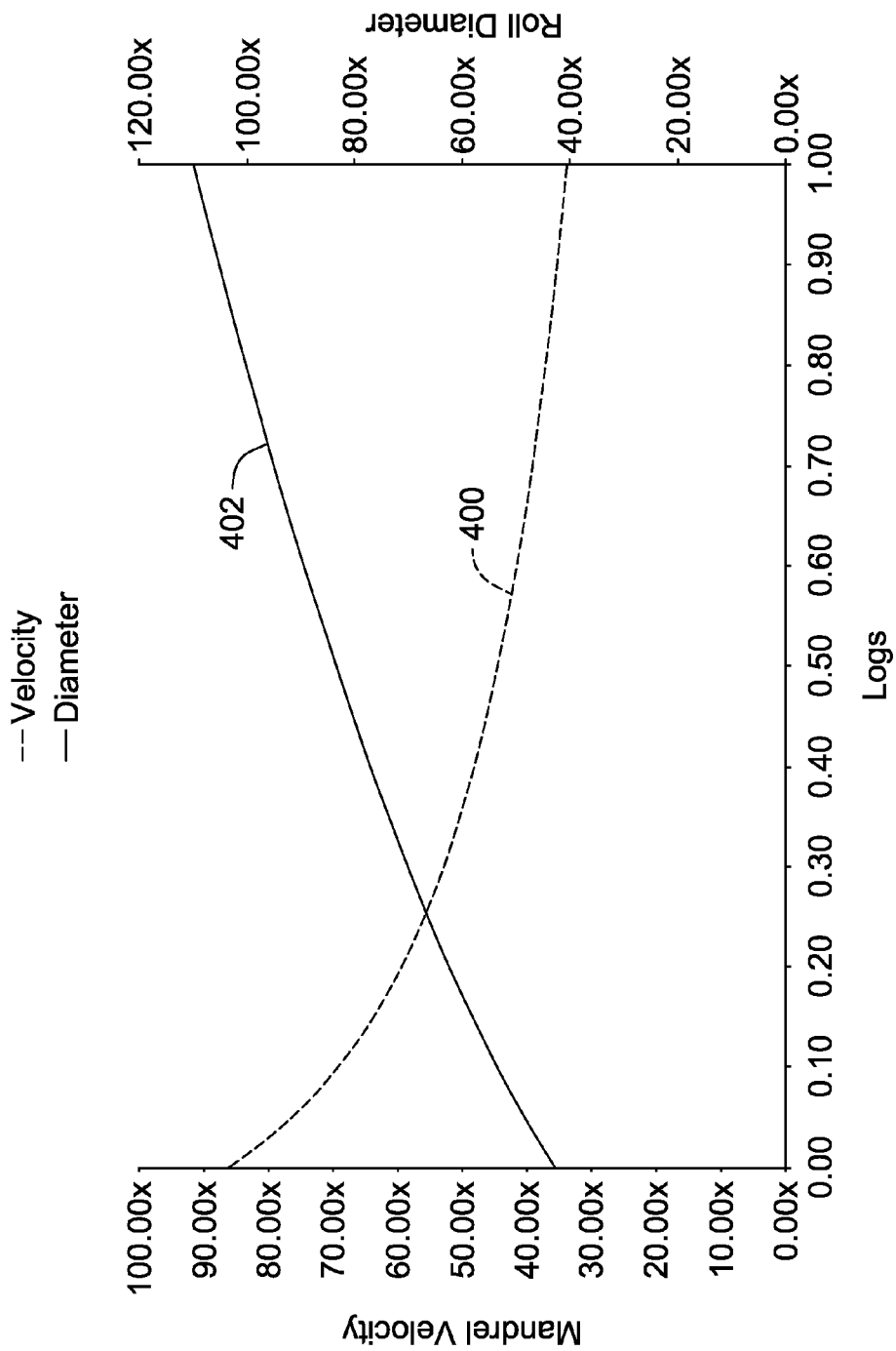
FIG. 4 is a graph of spool velocity and roll diameter over the course of winding a single roll.

FIG. 4 is a graph of the velocity of the spool 118 and the diameter of the roll 202 over the course of winding the web of material 200 into a finished roll. More specifically, a curve 400 represents the angular velocity of the spool 118 during the course of winding roll 202 and a curve 402 represents the diameter of the roll 202, as measured by scanning device 122 during the course of winding the roll 202 into a finished roll 202. As the roll 202 increases in diameter, the angular velocity of the spool 118 decreases to maintain a target amount of tension on the web 200. As described with reference to FIG. 1, parameters such as the tension are incorporated into an electronic cam profile that is used by the PLC 104 (FIG. 1) and the servo drive 106 to control the servo motor 108. Upon analyzing the measurement data from generating the roll 202, the second computing device 126 may determine that in order to achieve a target characteristic for a subsequent roll, such as a different density (ratio of sheets to diameter), a different compressibility, a different number of sheets, or a different diameter, the angular velocity of the spool 118 and/or the tension exerted on the web 200 must be adjusted (i.e., increased or decreased) by a certain amount.

Example tensions may be between 4 to 20 pounds. Accordingly, for a 100 inch wide roll, a tension of approximately 0.04 to 0.20 pounds per linear inch (PLI) is applied. In some embodiments, the tension is controlled (i.e., selectively increased, decreased, or maintained) upstream of web winding and measuring system 100 and rather than modifying a tension directly, a targeted diameter set point is modified. The set point impacts the entire winding profile and changes the rate at which the web of material 200 builds on rotatably-mounted spool 118. More specifically, the rotational speed of the spool 118 affects the amount of tension applied to the web of material 200. Accordingly, the system 100 may selectively increase, decrease, or maintain the tension, the rotational speed of spool 118, and/or other parameters during the winding of a roll to achieve target characteristics for the roll.

Figure 5:
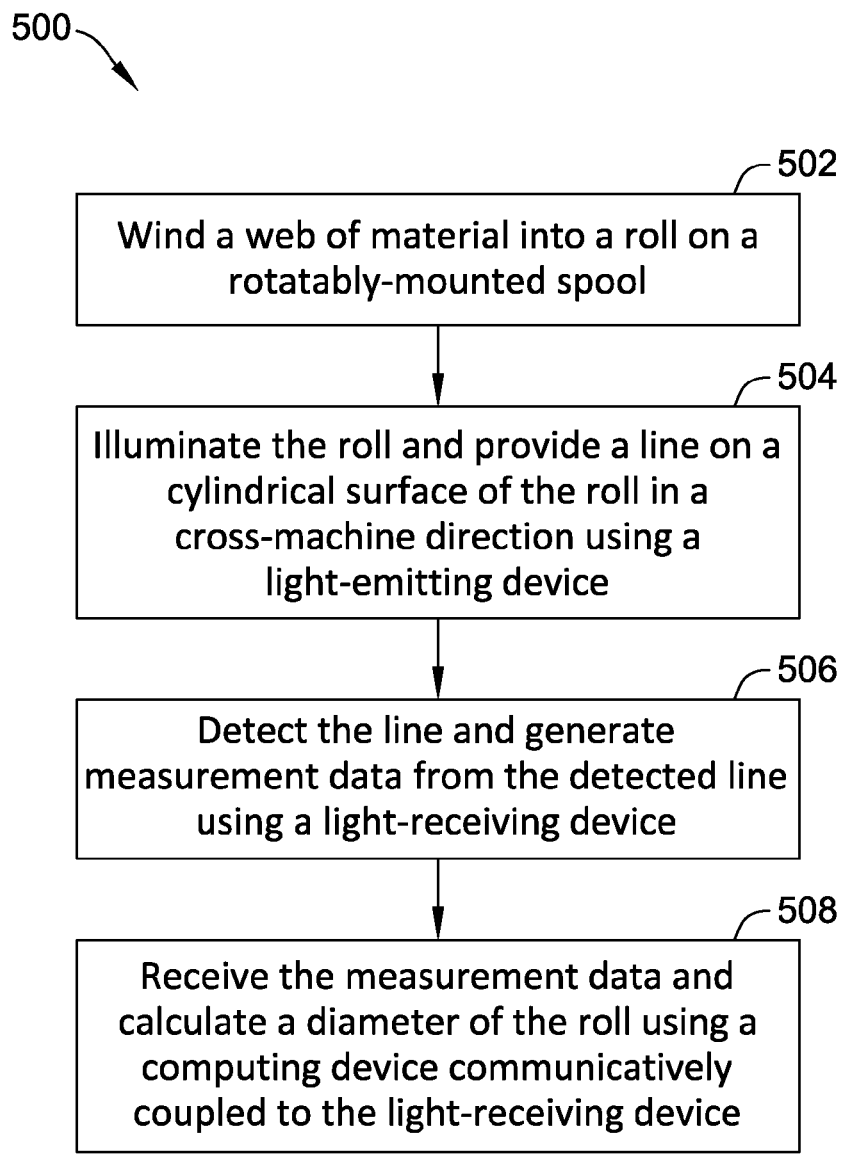
FIG. 5 is a flowchart of a process that may be performed by the web winding and measuring system of FIG. 1.

FIG. 5 is a flowchart of a process, indicated generally at 500, that may be performed by the web winding and measuring system 100. The process 500 includes winding 502 the web of material 200 into the roll 202 on the rotatably-mounted spool 118. Additionally, the process 500 includes illuminating 504 the roll 202 and providing the line 204 on the cylindrical surface of the roll 202 in a cross-machine direction, by the light-emitting device 206. Additionally, the process 500 includes detecting 506 the line 204 and generating measurement data from the detected line 204, by the light-receiving device 208. Further, the process 500 includes receiving 508 the measurement data and calculating a diameter D1 of the roll 202, by a computing device, such as the second computing device 126, which is communicatively coupled to the light-receiving device 208, via interface board 124. As described above, the system 100 continuously repeats the process to adjust parameters such as tension on the web 200 and the angular velocity of the spool 118 to achieve one or more target characteristics for the roll 202 and subsequent rolls.

In one example, a web of material is wound into a finished roll having a diameter of 100 millimeters. The finished roll includes 180 sheets, and the resulting density of the roll is 1.8 sheets per millimeter, on average. The web of material has a first topography of indentations and embossments that causes the density of the roll to increase as the web is being wound. During the formation of the rolls, the encoder 120, the scanning device 122, the tension sensor 121, and the humidity controller 123 transmit data to interface board 124, which then transmits the data to second computing device 126.

The measurement data collected by the scanning device 122 and stored in the storage device 310 of the second computing device 126 indicates that sheets closer to the center of the roll begin to compress more under the wound-in-tension of additional sheets that are added to the roll as the web is being wound. Over the course of winding an additional 49 rolls, operating parameters including tension exerted on the web, the speed at which the web is wound, and the ambient humidity are varied. The second computing device 126 applies regression analysis to the collected data and generates a mathematical model that may be used to simulate and predict resulting characteristics of the finished roll based on starting parameters and operating parameters.

More specifically, the mathematical model indicates that the parameter that has the most influence on the resulting diameter of the roll for a given number of sheets is the tension exerted on the web as the web is being wound. That is, the mathematical model indicates that by dividing the tension by the diameter of the roll as the web is being wound, the sheets throughout the roll are compressed by an equal amount, the resulting density is constant throughout the roll. Using the mathematical model, the second computing device 126 can predict the resulting diameter of a roll for a given number of sheets of the web, when the tension is controlled (i.e., selectively increased, decreased, or maintained) as described above to cause a uniform density throughout the roll. Accordingly, operators of the web winding and measuring system 100 may obtain a roll having target diameter and a constant density by using the mathematical model generated by the second computing device 126.

As another example, a web of material having a second topography that is different from the first topography discussed above is wound using the process described above. After 50 rolls have been wound under varying operating parameters, the second computing device 126 applies regression analysis to the collected data of how the diameter of each of the 50 rolls grew as they were formed, and generates a mathematical model that, like in the example discussed above, shows that sheets towards the center of the rolls compress more than sheets closer to the outer circumference of the rolls. Additionally, the mathematical model indicates that the primary factor in controlling the compression of the sheets is the tension exerted on the web as each roll is being wound. However, as a result of the second topography being different from the first topography, the mathematical model indicates that a constant density throughout the roll can be achieved by a different control method, which is dividing the tension by one half of the diameter of the roll as the web is being wound.

As a further example, a first set of 50 rolls are wound using a first web that has a first chemistry (e.g., a perfume, an anti-viral chemical, or a dye). Next, a second set of 50 rolls are wound using a second web that has a second chemistry that is different from the first chemistry. All other starting parameters, including the thickness of the first web and the second web, the diameter of the cylinder onto which each web is wound, and the topography of each web, are equal. During the formation of the rolls, the encoder 120, the scanning device 122, the tension sensor 121, and the humidity controller 123 transmit data to interface board 124, which then transmits the data to second computing device 126. By applying regression analysis to the received data, the second computing device 126 generates a first mathematical model for the first set and a second mathematical model for the second set.

The first mathematical model and the second mathematical model both indicate that ambient humidity is the primary factor in controlling the characteristics of the resulting rolls. More specifically, the first and second mathematical models indicate that compressibility, density, and resulting diameter are most largely affected by the ambient humidity, such that a higher ambient humidity causes more compression in the sheets, a higher density of the roll, and a lower diameter of the roll for a given number of sheets. Moreover, the first model and the second model differ in that for the same target density in the resulting rolls, the ambient humidity when winding the first web having the first chemistry must be higher than the ambient humidity for the second web having the second chemistry. More specifically, the different chemistries result in a different amount of compression caused by the ambient humidity. In other embodiments, the ambient humidity is controlled (i.e., selectively increased, decreased, or maintained) to selectively increase or decrease the thickness or caliper of the web of material 200.

As a further example, 50 rolls are formed using the web winding and measuring system 100. Each roll is wound on a different cylinder, such that the first roll is formed on a cylinder having a diameter of one millimeter. The diameter of the cylinder is increased for each roll, by one millimeter. Accordingly, the last roll of the set is formed on a cylinder having a diameter of 50 millimeters. During the formation of the rolls, the encoder 120, the scanning device 122, the tension sensor 121, and the humidity controller 123 transmit data to interface board 124, which then transmits the data to second computing device 126. The second computing device 126 stores the data in storage device 310 for analysis.

Continuing the example, the second computing device 126 applies regression analysis to the collected data and generates a mathematical model for simulating the formation of a roll and predicting the resulting characteristics of the roll under a given set of parameters. More specifically, the mathematical model indicates that as the diameter of the roll increases, the density of the roll at any given diameter is equal to the diameter divided by the product of the tension multiplied by the diameter of the cylinder. Using the mathematical model generated from the collected data, operators of web winding and measuring system 100 may then simulate a process of winding rolls on cylinders of different diameters and may learn from the mathematical model what starting parameter (e.g., cylinder diameter) is needed to achieve a roll with a certain density and diameter.

As yet another example, 50 rolls are formed by web winding and measuring system 100 using webs of increasing thickness. The first roll is wound using a web having a thickness of 1 millimeter and the fiftieth roll is formed with a web having a thickness of 50 millimeters. During the formation of the rolls, the encoder 120, the scanning device 122, the tension sensor 121, and the humidity controller 123 transmit data to interface board 124, which then transmits the data to second computing device 126. Subsequently, the second computing device 126 applies regression analysis to the collected data and generates a mathematical model that describes how the characteristics of a roll are affected by the thickness of the web of material that is wound into the roll. The mathematical model indicates, for example, that the density of the roll at any given diameter is equal to the diameter divided by the product of the rotational speed of the spool 118 multiplied by the thickness of the web. Accordingly, operators of winding and measuring device 100 can simulate the winding of webs of different thicknesses and accurately predict the resulting characteristics of finished rolls.

Additionally, mathematical models generated using processes similar to those described above may be used to achieve target characteristics of a roll that are not constant or uniform throughout the roll. Rather, the models may be used to selectively adjust a parameter, such as the rotational speed of the spool 118, during the formation of the roll to achieve a target characteristic, for example a target non-uniform density throughout the roll.

As will be appreciated by those skilled in the art, the examples given above illustrate possible uses of the described systems and methods. The mathematical models described in the examples above are provided only to illustrate that the described system may generate mathematical models based on data collected during the formation of one or more rolls, and do not necessarily represent how characteristics of rolls would actually be affected under the parameters described in the examples.

A technical effect of systems and methods described herein includes at least one of: (a) winding a web of material into a roll on a rotatably-mounted spool; (b) illuminating the roll and providing a line on a cylindrical surface of the roll in a cross-machine direction, by a light-emitting device; (c) detecting the line and generating measurement data from the detected line, by a light-receiving device; and (d) receiving the measurement data and calculating a diameter of the roll, by a computing device communicatively coupled to the light-receiving device.

As compared to known systems and method for winding a web of material into a roll, the systems and methods described herein facilitate measuring the diameter of the roll as the roll is being wound, thereby facilitating efficient adjustment of parameters used in controlling the winding of the web, for example the tension exerted on the web of material, to achieve target characteristics for subsequent rolls. Moreover, the systems and methods described herein facilitate adjusting a thickness or caliper of a web of material that is wound into a roll. For example, the desired thickness may be achieved through the use of a calendar or embossing section.

When introducing elements of the present invention or the preferred embodiment(s) thereof, the articles "a", "an", "the", and "said" are intended to mean that there are one or more of the elements. The terms "comprising," "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A web winding and measuring system, comprising:
a rotatably-mounted spool onto which a web of material is wound to form a roll, the rotatably-mounted spool configured to turn at a rotational speed;
a light-emitting device configured to illuminate the roll by light, providing a line on a cylindrical surface of the roll in a cross-machine direction;
a light-receiving device configured to detect the line and generate measurement data from the detected line as the web of material is wound onto the spool; and a computing device communicatively coupled to said light-receiving device and configured to:
receive the measurement data;
calculate a diameter of the roll; and
adjust the rotational speed based on the diameter.

2. The web winding and measuring system of claim 1, wherein said computing device is further configured to generate, in a memory coupled to said computing device, a three dimensional profile of the roll.

3. The web winding and measuring system of claim 1, wherein said computing device is further configured to:
determine at least one target characteristic of the roll to be achieved,
analyze the measurement data to determine whether the at least one target characteristic has been achieved;
upon determining the at least one target characteristic has not been achieved, adjust a parameter to achieve the target characteristic.

4. The web winding and measuring system of claim 3, wherein the parameter comprises an amount of tension exerted on the web.

5. The web winding and measuring system of claim 3, wherein the at least one target characteristic comprises a target number of sheets of the roll.

6. The web winding and measuring system of claim 3, wherein the at least one target characteristic comprises a target diameter for the roll.

7. A method for winding a web of material into a roll and measuring the roll, the method comprising:
winding a web of material into a roll on a rotatably-mounted spool turning at a rotational speed;
illuminating the roll and providing a line on a cylindrical surface of the roll in a cross-machine direction, by a light-emitting device;
detecting the line and generating measurement data from the detected line, by a light-receiving device as the web of material is wound onto the spool; and
receiving the measurement data by a computing device communicatively coupled to the light-receiving device;
calculating a diameter of the roll, by the computing device; and
adjusting the rotational speed based on the diameter.

8. The method of claim 7, further comprising generating, in a memory coupled to the computing device, a three dimensional profile of the roll.

9. The method of claim 7, further comprising:
determining at least one target characteristic of the roll to be achieved,
analyzing the measurement data to determine whether the at least one target characteristic has been achieved;
upon determining the at least one target characteristic has not been achieved, adjusting a parameter to achieve the target characteristic.

10. The method of claim 9, wherein adjusting the parameter includes determining an amount of tension to be exerted on the web.

11. The method of claim 9, wherein determining at least one target characteristic includes determining a target number of sheets of the roll.

12. The method of claim 9, wherein determining at least one target characteristic includes determining a target diameter for the roll.

13. The method of claim 7, wherein determining at least one target characteristic includes determining a target ratio of a number of sheets of the roll to a diameter of the roll.

* * * * *